United States Patent
Dubois

(10) Patent No.: US 8,814,959 B2
(45) Date of Patent: Aug. 26, 2014

(54) BIOFUEL CONSISTING OF A MIXTURE OF NATURALLY OCCURRING FATTY ACID ESTERS AND METHOD FOR PRODUCING SAID BIOFUEL

(75) Inventor: Jean-Luc Dubois, Millery (FR)

(73) Assignee: Arkema France, Colombes (FR)

( * ) Notice: Subject to any disclaimer, the term of this patent is extended or adjusted under 35 U.S.C. 154(b) by 318 days.

(21) Appl. No.: 13/265,213

(22) PCT Filed: Apr. 20, 2010

(86) PCT No.: PCT/FR2010/050759
§ 371 (c)(1),
(2), (4) Date: Nov. 14, 2011

(87) PCT Pub. No.: WO2010/122265
PCT Pub. Date: Oct. 28, 2010

(65) Prior Publication Data
US 2012/0124895 A1    May 24, 2012

(30) Foreign Application Priority Data

Apr. 24, 2009    (FR) ...................................... 09 52698

(51) Int. Cl.
*C10L 1/18*    (2006.01)
*C10L 1/19*    (2006.01)
*C10L 1/02*    (2006.01)

(52) U.S. Cl.
CPC . *C10L 1/19* (2013.01); *C10L 1/026* (2013.01); *Y02E 50/10* (2013.01); *Y02E 50/13* (2013.01)
USPC ........................................................... 44/388

(58) Field of Classification Search
CPC ........... C10L 1/19; C10L 1/026; Y02E 50/10; Y02E 50/13
USPC ........................................................... 44/388
See application file for complete search history.

(56) References Cited

U.S. PATENT DOCUMENTS

| 2,737,519 A | * | 3/1956 | Genas et al. | .................. 554/163 |
| 2,807,633 A | * | 9/1957 | Khaladji et al. | ............... 554/163 |
| 4,364,743 A | * | 12/1982 | Erner | .............................. 44/388 |
| 5,389,113 A | * | 2/1995 | Demmering et al. | ........... 44/388 |

* cited by examiner

*Primary Examiner* — Cephia D Toomer
(74) *Attorney, Agent, or Firm* — Smith, Gambrell & Russell, LLP

(57) ABSTRACT

The invention relates to a diesel biofuel consisting of a mixture of naturally occurring fatty acid esters and containing an ester of ω-unsaturated acids having a chain with 11 or 13 carbon atoms or corresponding saturated acids. The invention also relates to a method for producing such a biofuel.

5 Claims, 2 Drawing Sheets

1

BIOFUEL CONSISTING OF A MIXTURE OF NATURALLY OCCURRING FATTY ACID ESTERS AND METHOD FOR PRODUCING SAID BIOFUEL

FIELD OF THE INVENTION

The subject of the present invention is a diesel biofuel consisting of a mixture of naturally occurring fatty acid esters and containing an ester of ω-unsaturated acids comprising a chain with 11 or 13 carbon atoms or corresponding saturated acids.

BACKGROUND OF THE INVENTION

The replacement of fossil energies in order to ensure future energy needs constitutes an essential preoccupation. In this context, biodiesel constitutes a substitute for fuels produced using petroleum (petrodiesel). The term "biodiesel" should be understood to mean fuels that use, as raw material, natural products resulting from cultivation or farming, i.e. renewable products.

This approach, which has been used for several decades, has been the subject of considerable studies which have resulted in biofuels for diesel engines being placed on the market. The basis of these studies has been the use of vegetable oils obtained from seeds of various plants, such as rape, soybean, sunflower, palm, etc., or of animal fats which consist of a mixture of triglycerides of fatty organic acids, the chain length of which is generally between 16 and 18 carbon atoms. Thus, a range of biodiesels has been developed, known under the abbreviation FAME for Fatty Acid. Methyl Ester, a predominant molecule of which is the methyl ester of oleic acid. Similarly, EASE (Fatty Acid Ethyl. Ester) has been developed. They form what are known as first-generation biodiesels.

These esters can be obtained by direct transesterification of the vegetable oil, obtained from the seeds of these plants, and by analogy transesterification of the anima fat, in the presence of methanol, which results in a mixture of esters of which the formulae depend on the nature of the oils or fats used as feedstock.

These esters can also be obtained, in a first step, by hydrolysis of the triglycerides contained in these oils or fats, and, then, in a second step, by esterification with methanol. Between these two steps, it is possible to perform a separation of the acids in order to obtain an ester mixture enriched in at least one of these esters.

The fatty acid compositions of a vast majority of oils and fats can be found in the publication "Pure and Applied Chemistry 73, 685-744" IUPAC 2001, this list having been established as it happens for food use, but which can in all, cases be used for the production of biodiesels. Aside from a few "exotic" examples such as coconut oil, palm kernel oil and babassu oil which contain "short" fatty acids with 12 carbon atoms, all the others are based essentially on saturated or unsaturated C16 and C18 acids.

Moreover, a broad study carried out by Gerhard Knothe and his collaborators has analyzed the key factors in the choices made in terms of fatty esters for the formulation of biodiesels. This study is summarized in the article entitled. *"Designer" Biodiesel: Optimizing Fatty Ester Composition to Improve Fuels Properties* published in "Energy & Fuels" 2008, 22, 1358-1364. This article deals with the influence of the structure of the fatty acids, namely their chain length, the presence or absence of double bonds and the presence of hydroxyl functions, on their properties from the viewpoint of the specifications for diesel fuel as defined in standards ASTM D6751 and EN 14214, and in particular the cetane number, the viscosity, the cold flow properties and the oxidation stability. The conclusion of this study is that methyl oleate is indeed the main basic molecule of the mixture, the performance levels of which can be improved by adding other specific esters.

This study is essentially technical. From a practical point of view, it is also necessary to look at this from a political point of view, taking into account an important additional parameter, namely that this crop product or the cultivation of this product should not have an effect on the development of the crop intended for human food that is essential with the change in the world population. It is becoming increasingly important to develop industrial crops which are not in competition with the food applications.

To summarize, the selection of one of these routes naturally depends on the "thermal and energy" properties of the fuels thus obtained, but also on three important additional criteria, namely compatibility of these fuels with the engines currently used, compliance with the new standards for $CO_2$ emissions and harmonization (noncompetition) with the crops dedicated to food.

"Second-generation" biodiesels are also known, which are obtained by hydrotreating the vegetable oils, resulting, by hydrogenation, in isomerized or nonisomerized long-chain hydrocarbons. The isomerization of the paraffins makes it possible to significantly reduce the cloud point, i.e. the temperature at which the paraffins begin to crystallize.

Finally, it has also been proposed, in an article by N. M. Irving published in the $16^{th}$ European Biomass Conference, Jun. 2-6, 2008, Valencia, Spain, under the title "Clean, High Enthalpy Biofuels", to replace, by nitrilation, the acid function of the fatty acid with a nitrile function. These fatty nitriles, obtained either by nitrilation of the natural fatty acids obtained by hydrolysis of the triglycerides of the oil resulting from the seeds, said acids comprising chains of between C12 and C18 and centered mainly on C16, or by direct nitrilation of the oil, appear to give excellent results as biodiesels.

The problem to be solved is therefore that of finding a diesel fuel based on a renewable source, which as much as possible meets the specifications for biodiesels (standards ASTM P6751 and EN 14214) and in particular the octane number, melting point, viscosity and oxidation stability criteria, using a source which does not lead to the production of food products in order to avoid any "prohibited" competition. These biodiesels must of course be completely compatible with the fuels from oil with which they are, so far, most of the time used as a mixture.

Among these possible sources, mention may be made of oils containing hydroxy acids which are not very suitable for human food, and in particular the castor plant. Indeed, the castor seed has an oil content of approximately 50%. In addition, castor oil, which contains more than 80% by weight of ricinoleic acid and approximately 15% by weight of oleic acid and linoleic acid, has no food application, which is of considerable advantage in the current fuel versus food debate. This oil therefore appeared to be able to constitute an excellent source for the production of biodiesels, all, the more so since this plant has a particularly high yield per hectare and can also grow in very difficult soils and under conditions with low rainfall, where few food plants can be cultivated, which limits, a fortiori, the competition with plants for food applications. Unfortunately, as reported by G. Knothe on page 1364 of the article "Energy & Fuels" mentioned above, methyl ricinoleate has properties which a priori exclude its use as a base in a biodiesel application. Specifically, its viscosity at low temperature is very high, its melting point is close to 0° C. and its cetane number is well below the specification. To complete the picture, it may be added that its oxidation stability is lower than those of methyl oleate and methyl linoleate.

The use of castor oil in the biodiesel application is also mentioned in the article "Thermoanalytical characterization, of castor oil biodiesel" by Marta M. Conceicao at al, published in Renewable and Sustainable Energy Reviews—11 (2007) 964-975 (Elsevier). This essentially analytical, article illustrates the problem of the viscosity and also refers to a very high density which in fact is outside diesel specifications. The octane aspect is addressed only incidentally on page 969, paragraph 2, indicating that transesterification reduces the viscosity of the oil without modifying the octane thereof, the value of which is not known. The unsuitability of the castor plant for this application is probably due to the presence of the OH radical in the β-position with respect to the double bond. The same problem is found with the seeds of plants of the *Lesquerella* genus, in particular *Lesquerella fendieri*, from which is extracted an it containing lesofuerolic acid at more than 50% by weight and, as a mixture, approximately 35% by weight of various, in the majority unsaturated, C18 acids.

The obvious advantage of castor oil as a base for a biodiesel has led some researchers, as reported by G. Knothe, to carry out studies on the genetic modification of the castor seed species with a view to producing much more oleic acid and less ricinoleic acid. In this respect, mention may be made of the studies by Pilar Rolas-Barros published in Crop Science, vol. 44, January-February 2004, pp. 76-80 and vol. 45, January-February 2005, pp. 157-162.

DETAILED DESCRIPTION OF THE INVENTION

Figure 1:
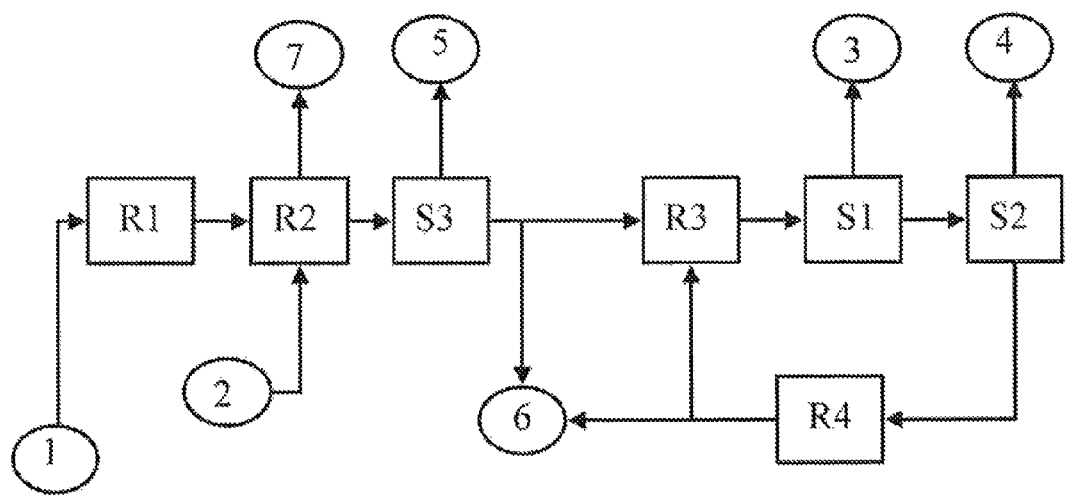
FIG. 1 is a schematic of a process in accordance with the present invention.

The invention proposes to overcome the drawbacks by producing a biodiesel from the seeds of plants rich in unsaturated hydroxy acids, such as the castor plant and lesquerella by extraction of the oil contained in the seed, conversion of the ricinoleic acid and/or of the lesguerolic acid contained in the oil into the methyl or ethyl ester form thereof by transesterification (or hydrolysis and esterification), and then cracking of the latter to give ω-unsaturated C11 and/or C13 esters, which can if necessary be saturated by subsequent hydrogenation of the ω-unsaturated esters.

The subject of the invention is a biodiesel fuel comprising a mixture of fatty acid esters, said mixture containing at least 1% of a naturally occurring non-fossil compound of formula ROOC—$(CH_2)_n$—$CH_2$—$R_1$ in which. R is either $CH_3$ or $C_2H_5$, n is 7 or 9, and $R_1$ is either $C_2H_5$ or $CH=CH_2$.

The content of this compound in the mixture depends on the desired performance levels according to the specifications and the process for production of the biodiesel which can be based on the use either of a single source of oleaginous seeds or of a combination of seeds (extracted from oleaginous plants such as sunflower, rape, soybean, groundnut, olive, sesame, safflower, coconut, palm, etc.) or, finally, of a subsequent mixture of this mixture with biodiesel fuels of different origins or even diesel fuels from oil with which they are compatible.

Generally, the content by weight of this compound in the mixture of biodiesel fuels (fatty acid esters) is between 1 and 100% and preferably between 20 and 70%, even more preferably between 30 and 60%.

The ω-unsaturated ester compounds comprising either 11 or 13 carbon atoms have, regardless of whether or not they have been subjected to a subsequent hydrogenation, physicochemical characteristics corresponding to the specifications of biodiesels. They can therefore be used "pure" in this application. However, for economic reasons, they may be added to a biodiesel of different origin in order to give it, according to the amount added, the performance levels necessary for use.

For the purpose of the present invention, the term "biodiesel fuel" is intended to mean a fuel corresponding to the specifications for diesel fuel as defined in standards ASTM D6751 and EN 14214, and in particular the octane number, the viscosity, the cold flow properties and the oxidation stability. Preferably, a biodiesel fuel within the meaning of the present invention corresponds to the specifications defined in the "Biodiesel Handbook", by Gerhard Knothe, Jon Van Gerpen, and Jürgen Krahl, ADCS press, 2005.

In addition, since its production process is based on the conversion of the castor plant (or of lesquerelia) in seed or oil form, it is, in terms of economics, essential to exploit the other esters present in the oil that are capable of being used in a biodiesel fuel composition, and thus to optimize costs.

For example, a biodiesel fuel produced only on the basis of the castor plant may have the following composition by weight:

C11: 1 methyl ω-undecylate from 17 to 92%
C16: 0 methyl palmitate from 1 to 5%
C18: 0 methyl stearate from 1 to 7%
C18: 1 methyl oleate from 3 to 20%
C18: 2 methyl linoleate from 3 to 20%
C18: 1 OH methyl ricinoleate from 0 to 35%.

Preferably, the naturally occurring non-fossil compound corresponds to the formula $CH_3OOC$—$(CH_2)_8$—$R_1$ in which $R_1$ is either $CH_2H_5$ or OH—$CH_2$, or to the formula $CH_3OOC$—$(CH_2)_{10}$—$R_1$ in which $R_1$ is either $C_2H_5$ or $CH=CH_2$.

This compound comprising 11 or 13 carbon atoms is synthesized from the seeds of the castor plant (*Ricinus communis* L. and other species) for the 11-atom compound and from the seeds of lesquerella (*Lesquerella fendleri* and other species) for the 13-atom compound, from which seeds the corresponding oil is extracted according to a perfectly known process.

Thus, the invention also relates to a process for producing a diesel fuel as defined above, in which process use is made, as raw material, of the oil resulting from castor and/or lesquerella seeds, said oil being subjected to the following treatment:

1) transesterification of the triglycerides of the oil in the presence of a light alcohol, preferably methanol, or ethanol, and then separation of the glycerol formed,
2) separation of the nonhydroxylated fatty esters so as to form a fraction enriched in hydroxy esters,
3) cracking of the enriched ricinoleic and/or lesguerolic acid hydroxy ester fraction so as to form the acid ester of formula ROOC—$(CH_2)_n$—$CH_2$—$R_1$, in which R is either $CH_3$ or $C_2H_5$, n is 7 or 9, and $R_1$ is $CH=CH_2$, without this cracking having an effect on the residual C18 unsaturated esters (oleic, linoleic and linolenic), 4) separation, for example by distillation, of the heptanaldehyde formed and production of an effluent comprising C11 and/or C13 ω-unsaturated esters and ricinoleic and/or lesquerolic acid hydroxy esters not converted during the cracking in step 3, which, after mixing with the nonhydroxylated fatty esters previously separated, will form said biodiesel fuel.

In one variant of the process, step 1 can also be carried out in two stages: hydrolysis of the triglycerides and then esterification of the acids formed.

In another variant of the process, since the degree of cracking in step 3 is generally between 50 and 70%, the ester mixture produced during step 4 will simultaneously contain C11 and/or C13 ω-unsaturated esters and ricinoleic and/or lesquerolic acid hydroxy esters. The latter esters, separated from the ω-unsaturated esters, may be advantageously recycled as feedstock for step 3 in order to increase the overall degree of cracking.

In another variant of the process, it is possible, after the separation of the glycerol, during step 2, not to carry out the separation of the nonhydroxylated fatty esters, and therefore to form a crude ester fraction, i.e. a mixture corresponding to all the fatty acids, hydroxy acids and the like, present in the treated seeds and the oil which is produced therefrom. The cracking in step 3 has no effect on the structure of the C18 unsaturated esters (oleic, linoleic and linolenic). After separation, during step 4, of the heptanaldehyde from the ester mixture which consists of the (C11/C13) ω-unsaturated esters, of the ricinoleic and/or lesquerolic hydroxy esters not converted during step 3 and of the C16 and 18 esters, the residual fraction of the esters, essentially the ricinoleic and/or lesquerolic hydroxy esters, can, after separation of the ω-unsaturated esters, be recycled as feedstock for step 3, in order to obtain a better conversion of said hydroxy esters.

This recycling will advantageously be preceded by an enrichment of said fraction in ricinoleic and/or lesquerolic hydroxy esters by extraction of the C18 esters (oleic, linoleic and linolenic, etc.) in order to avoid an accumulation of the latter in the cracking reactor. This fraction will also be advantageously subjected, before or after extraction of the C18 esters, to an esterification in order to reduce the free fatty acids possibly formed during the cracking which is carried out in the presence of water vapor.

In another implementation variant of the process, an esterification of the effluent exiting the cracking may be carried out before any fractionation of the esters, in order to avoid any presence of the acid form of the molecules forming the mixture. This will thus do away with the need to treat separately each of the fractions making up the mixture constituting the biodiesel fuel.

In another variant of the process, a hydrogenation can be applied to the unsaturated C11 and/or C13 ester fraction so as to form the undecanoic ester ROOC—$(CH_2)_9$—$CH_3$ and/or tridecanoic ester ROOC—$(CH_2)_{11}$—$CH_3$, this being after having separated it both from the oleic and linoleic or linolenic esters and from the unconverted ricinoleic and/or lesquerolic esters.

It should be noted that the lesquerolic acid (14-hydroxy-11-eicosanoic acid) extracted from seeds originating from species of the *Lesquerella* genus is at a content of between 50 and 80%, depending on the species, in the oil extracted which also contains two other hydroxy acids: densipolic acid (12-hydroxy-9,15-octadecadienoic acid) and auricolic acid (14-hydroxy-11,17-eicosadienoic acid) which probably result in the same compounds, namely the C11 and C13 esters and an unsaturated aldehyde containing 7 carbons.

Thus, in preferred embodiments of the invention:

after the separation of the heptanaldehyde, the effluent is subjected to a separation of the C11 and/or C13 ω-unsaturated esters, and the ricinoleic and/or lesquerolic acid hydroxy ester fraction is totally or partially recycled to the cracking after having been optionally subjected to an esterification with methanol;

after separation of the glycerol, all of the esters resulting from the transesterification are subjected to cracking, the effluent of which is subjected to a series of successive separations, of heptanal first of all, of the C11 and/or C13 ω-unsaturated esters, and then finally of the nonhydroxylated fatty esters, the residual unconverted ricinoleic and/or lesquerolic acid hydroxy ester fraction being totally or partially recycled to the cracking after having been subjected, where appropriate, to an esterification with methanol, the biodiesel fuel consisting of the mixture of the C11 and/or C13 ω-unsaturated esters, of the nonhydroxylated fatty esters and, optionally, of a drawn-off part of the unconverted ricinoleic and/or lesquerolic acid hydroxy esters.

The oil is generally obtained from seeds by pressing, followed by extraction, optionally with an organic solvent such as hexane or acetone.

The transesterification of the oil is carried out at a temperature of between 20 and 80° C. in the presence of an excess of a light alcohol, preferably methanol, and in a basic medium (sodium hydroxide, potassium hydroxide, sodium methoxide, potassium methoxide, etc.) forming a catalyst.

The glycerol/ester (step 2), hydroxy ester/ester (step 2 or 4), (C11 and/or C13) ω-unsaturated ester, (C16/C18/C20) ester separations are generally carried out by distillation, but could also be carried out by any means known to those skilled in the art.

The cracking (or pyrolysis) of the esters is carried out at a temperature generally included between 500 and 650° C. in the presence of water vapor. This step is described in the handbook "Les Procédés de Pétrochimie" [Petrochemistry Processes] by A. Chauvel et al., published by Editions TECHNIP (1986) in the part devoted to the synthesis of 11-aminoundecanoic acid.

The implementation of the process in its different variants results, starting from the same raw material, in the production of a mixture of esters with, besides the ester of ω-undecylenic and/or ω-tridecylenic acid, essentially the esters of oleic acid, linoleic acid, linolenic acid, stearic acid and palmitic acid and also an unconverted ricinoleic and/or lesquerolic ester fraction. The respective contents of its constituents depend on the process chosen to implement it and on the objective sought in terms of performance levels in the context of biodiesel specifications, and that shown later in the description.

Another subject of the invention is an implementation variant of the process of the invention, in which the initial, step is carried out using, as feedstock, not the oil resulting from the extraction of the seeds, but directly the seeds themselves.

Indeed, the preparation of the fatty acid esters, from seeds of oleaginous plants, in two steps, namely a step of extracting oil, from the seeds optionally in the presence of solvent and a step of transesterification of this oil in the presence of alcohol and of a basic catalyst, resulting in the production of an ester phase and a glycerol phase, has been described above.

In the variant of the process, the preliminary step of extracting the oil from the seeds and the step of transesterification of the triglycerides are carried out in a single step. This new first step consists of a process of reactive grinding of the oleaginous castor or lesquerella seeds which makes it possible, starting from specifically processed seeds and in the presence of a light alcohol and of a basic catalyst, to perform the grinding and the reaction for transesterification of the triglycerides present in the oil in a single step, so as to result in the simultaneous production of an oilcake, of glycerol and of fatty acid esters, in particular ricinoleic and/or lesguerolic acid esters.

A subject of the invention is a process for producing a biodiesel fuel consisting of a mixture of fatty acid esters, said mixture containing at least 1% of a naturally occurring non-fossil compound of formula ROOC—$(CH_2)_n$—$CH_2$—$R_1$ in which R is either $CH_3$ or $C_2H_5$, n is 7 or 9, and $R_1$ is either $C_2H_5$ or $CH=CH_2$, said compound comprising 11 or 13 linear carbon atoms and being synthesized from the seeds of the castor plant (*Ricinus communis* and the like) for the 11-atom compound and from the seeds of lesquerella (*Lesquerella fendleri* and the like) for the 13-atom compound, comprising the following steps
1) processing the seeds having a degree of acidity of less than 2 mg KOH/g without prior hulling,
2) bringing the processed seeds into contact with light anhydrous alcohol and an alkaline catalyst under temperature and time conditions sufficient to allow the simultaneous extraction and transesterification of the vegetable oil, and resulting in the production of a mixture comprising the fatty acid esters present in the seed, glycerol and an oilcake, then
3) separating the glycerol, and the oilcake formed,
4) cracking the resulting ester fraction containing a major proportion of ricinoleic and/or lesquerolic ester so as to form the acid ester of formula ROOC—$(CH_2)_n$—CH=$CH_2$, without this cracking having an effect the C18 unsaturated esters present in the feedstock (oleic, linoleic and linolenic),
5) producing a mixture of esters by separation (by distillation) of the heptanaidehyde formed.

This process differs from the preceding process only by virtue of the initial phases of production of the mixture of fatty esters, the end of which is marked by the separation of the glycerol. All the implementation variants of the first process are naturally applicable to the second; thus, the separation of the fatty esters from the hydroxy esters in order to feed the cracking with a fraction enriched in hydroxy esters, either subsequent to or during steps 2 and 3, or subseduent to or during steps and 5, will make it possible to increase the hydroxy ester cracking yield; thus, in addition, it will be possible to esterify the mixture of esters after the separation of the heptanaidehyde and, moreover, to hydrogenate, if necessary, the C11 and/or C13 ω-unsaturated esters.

Thus, preferably, the mixture of esters is subjected to a separation of the C11 and/or C13 ω-unsaturated esters, and then of the nonhydroxylated fatty esters, and the residual fraction of unconverted ricinoleic and/or lesquerolic acid hydroxy esters is totally or partially recycled to the cracking after having been subjected to an esterification with methanol; the biodiesel fuel consisting of the mixture of the C11 and/or C13 ω-unsaturated esters, of the nonhydroxylated fatty esters and, optionally, of a drawn-off part of the unconverted ricinoleic and/or lesquerolic acid hydroxy esters.

This variant of the process according to the invention makes it possible to react "in situ", on the one hand, the light alcohol with the oil, contained at the core of the seed and to react, on the other hand, the same alcohol with the triglycerides for transesterification; the alcohol plays the role of both an extraction solvent and a reactant.

An advantage of the variant of the process compared with the conventional processes lies in the small amounts of water used. The crude-oil refining operations, for example, consume large amounts of water. This water saving is a major asset in the context of the development of this technology in developing countries and, to a lesser extent, in rich countries, since water is tending to become an increasingly expensive commodity.

The first step of the process consists in processing the castor or lesquerella seeds, used alone or as a mixture with other seeds of oleaginous, oleaginous/protein-producing or protein-producing plants. This processing is carried out on whole seeds. It comprises a first operation in which the seeds are flattened, followed by an operation in which the flattened seeds are dried.

The objective of the processing of the seed is to make the oil as accessible as possible to the alcohol, without, however, causing too much modification of its mechanical strength. This prevents the formation of a paste and of fines, respectively prejudicial to the implementation of a continuous process and to the final purification of the esters produced. Moreover, the processed seed should allow easy passage of the reaction fluid (alcohol/basic catalyst mixture) according to a simple percolation phenomenon.

According to one embodiment variant, fresh seeds are flattened on a mechanical flattener with smooth or fluted rollers.

The seeds thus flattened are dried, for example in a ventilated oven which is thermoregulated or in continuous belt or rotary hot-air drier. The drying time and the temperature are chosen so as to obtain a decrease in the moisture of the seeds to values of less than or equal to 2% by weight. Preferably, the drying is carried out rapidly after flattening, within less than one hour, preferably after 5 to 10 minutes, at a temperature sufficient to reduce the moisture content of the seeds to 2% by weight or less.

The residual moisture of the seed is determined by thermogravimetric analysis. The seed is ground beforehand, and then the ground material obtained is dried at 105° C. in a thermobalance until stabilization of the weight. The water content is expressed as percentage of the crude material.

In one preferred embodiment variant, step 1) of processing the seeds also comprises a seed preheating operation, carried out before the flattening operation. This preheating operation gives the seed greater plasticity and therefore more effective crushing during flattening (gain in terms of contact surface, of alcohol percolation rate and therefore of extractive capacity of the alcohol). It is preferably carried out at a temperature of less than or equal to 100° C.

The implementation of the different variants of the processes according to the invention is illustrated by the schematic representations of FIGS. 1 to 4 in which:
1: represents the seed feed
2: represents the methanol (alcohol) feed
3: represents the fraction rich in heptanaldehyde
4: represents the fraction rich in C11-C13 ω-unsaturated acid methyl ester
5: represents the fraction rich in nonhydroxylated methyl esters
6: represents the fraction rich in unconverted hydroxylated fatty acid methyl ester
7: represents the glycerol.
R1: represents the seed grinding unit or reactive seed grinding unit
R2: represents the vegetable oil transesterification unit
R3: represents the unit for thermal cracking of the mixture of esters
R4: represents the optional unit for esterification of the fraction rich in unconverted hydroxylated fatty acid methyl esters.

S1: represents the unit for separating the heptanaldehyde from the other products resulting from R3
S2: represents the unit for separating the C11/C13 ω-unsaturated acid methyl ester from the other methyl esters which are uncracked
S3: represents the unit for separating the hydroxylated methyl esters from the other esters.

FIG. 1 illustrates the process according to which
- in R1, the oil is extracted from the seed introduced at (1) by conventional grinding in the presence or absence of a solvent that is not represented,
- in R2, the transesterification of the triglycerides is carried out by means of methanol introduced at (2); at exit from R2, the glycerol is separated, at (7), from the medium,
- in S3, the separation of the nonhydroxylated acid esters is carried out, said esters being drawn-off at (5), the hydroxylated esters being sent to R3,
- in R3, the hydroxylated ester fraction is subjected to a pyrolysis in the presence of water vapor (not represented),
- the effluent resulting from R3 is sent to S1, where the separation of the heptanaldehyde is carried out at (3), then
- the mixture of remaining esters is sent to S2, where the C11/C13 ω-unsaturated acid ester is separated, at (4), from the other methyl esters which are uncracked, which are recycled to R3,
- the recycled fraction is sent to R4, where an esterification is carried out by means of methanol (not represented) in order to eliminate the acids possibly formed during the pyrolysis; a fraction of the methyl esters which are uncracked can be drawn-off at (6) or totally recycled to R3.

Figure 2:
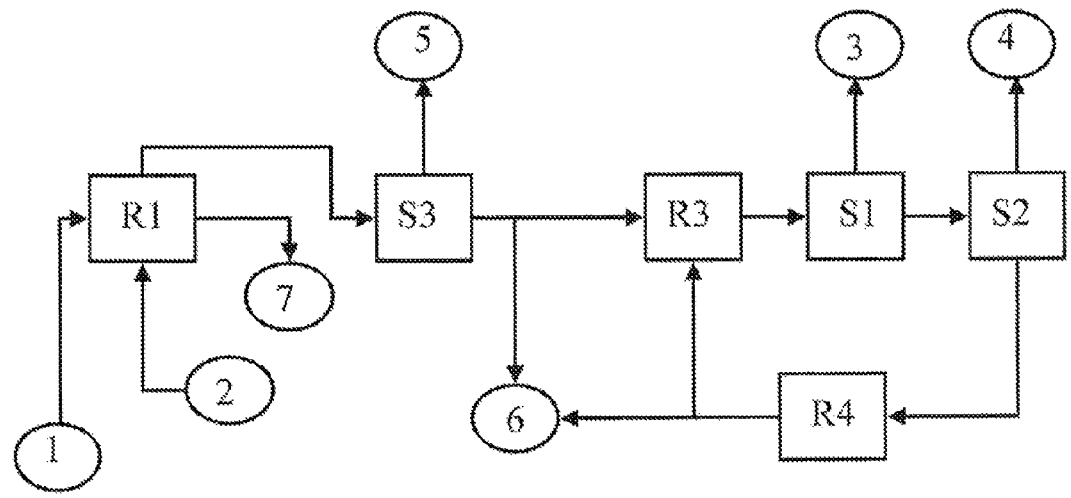
FIG. 2 is a schematic of an alternative process in accordance with the present invention.

FIG. 2 illustrates a process according to which, in R1, the reactive grinding of the seeds introduced at (1) is carried out by means of methanol introduced at (2); there is thus no need for the reactor R2. The extraction of the glycerol is carried out from R1 at (7) and the rest of the process is strictly identical to what has just been described.

Figure 3:
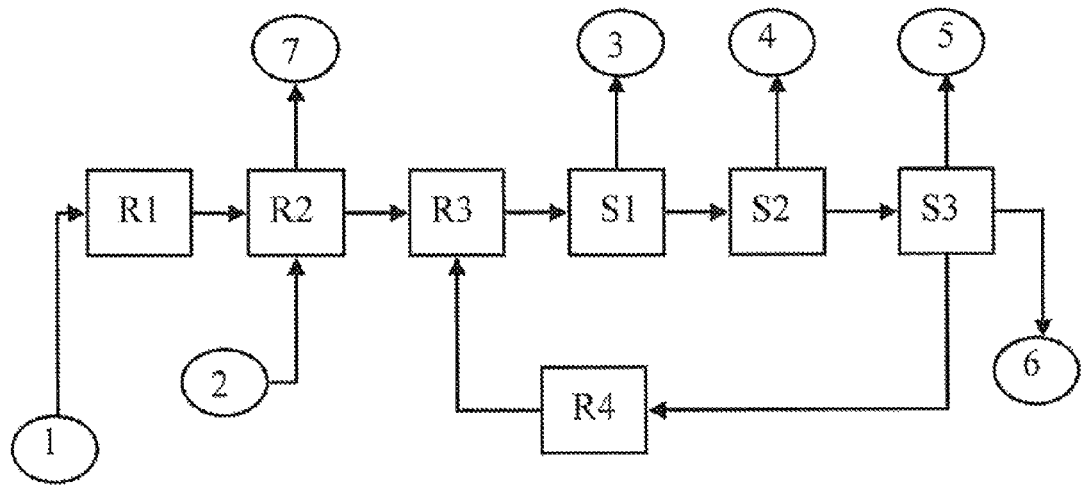
FIG. 3 is a schematic of an alternative process in accordance with the present invention.

FIG. 3 illustrates a process of which the initial phases are identical to those of FIG. 1 as far as the exit from R2, according to which all of the mixture of esters resulting from R2 is sent to the cracking reactor R3. The effluent exiting R3 is subjected to a series of separation in S1 for the heptanaldehyde at (3), then in S2 for the C11/C13 ω-unsaturated acid ester at (4) and, finally, in S3 for the nonhydroxylated acid esters at (5). The unconverted hydroxy esters not recycled to R3 are drawn off at (6). The recycling of the unconverted hydroxy esters to R3 involves an esterification in R4.

Figure 4:
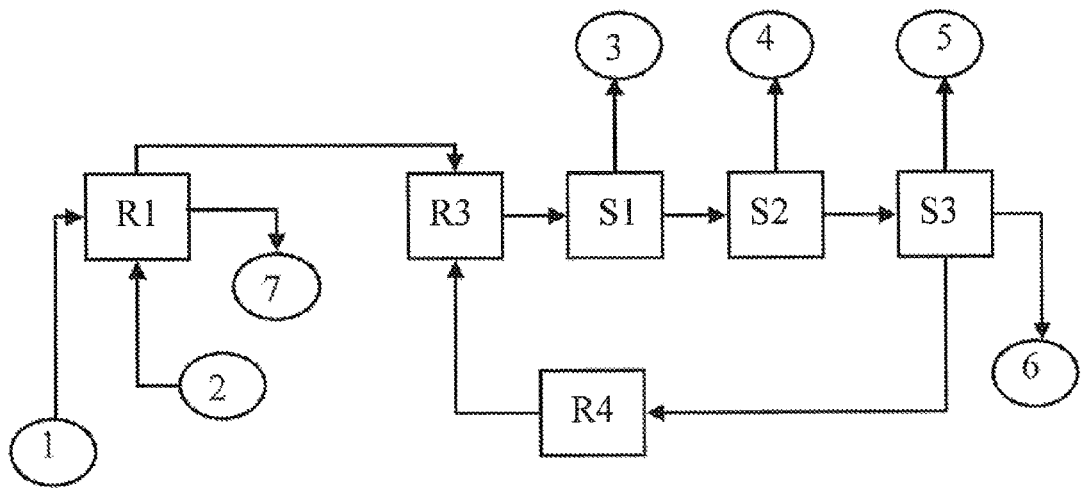
FIG. 4 is a schematic of an alternative process in accordance with the present invention.

FIG. 4 illustrates a process according to which, in R1, the reactive grinding of the seeds introduced at (1) is carried out by means of methanol introduced at (2); there is thus no need for the reactor R1. The rest of the process is strictly identical to what has just been described for FIG. 3.

For the production of the biodiesel fuels of the invention, it will, be advantageous, before the final mixing, to subject the fractions that have exited at (4) and (5) to an esterification in order to eliminate all traces of acid form.

The biodiesels of the invention will be illustrated by the examples hereinafter, carried out using a single source of hydroxy acids, castor oil (and more generally castor seeds),

EXAMPLE 1

Comparative

The "biodiesel" mixture A is obtained by simple transesterification of crude castor oil, without cracking, and therefore without recycling. It results in the following mixture of esters, expressed as % by weight:
C11: 1: 0
C16: 0: 1.3
C18: 0: 1.5
C18: 1: 4
C18: 1 OH: 86
C18: 2: 5

Conventionally, "C10" indicates the number of carbon atoms (10 in this case), ":1" the number of unsaturations (one in this case) and "OH" the presence of a hydroxyl function.

This mixture has a octane number, that can be measured according to standard EN14214:2003 (or ASTM 26751-07a), which is too low compared to the specification (>47 or 51). Its viscosity according to the same standards is too high, 13.8 $mm^2$ is at 40° C. (2-6), and the resistance to cold (melting point) is too high, −6.7° C. (<−20° C.).

EXAMPLE 2

The "biodiesel" mixture B will be produced from the mixture A which will be subjected to cracking at a conversion rate of 70%, and then separation of the heptanaldehyde formed and, finally, supplementary esterification of the mixture of esters obtained.

It will result in the following mixture of esters, expressed as % by weight:
C11: 1: 49.8
C16: 0: 1.7
C18: 1: 2.0
C18: 1: 5.3
C18: 1 OH: 34.4
C18: 2: 6.7

This biodiesel will have a cetane number of 50.3, which is within the specification but borderline low, an estimated viscosity of 7.5, which is a little high, slightly above the specification, quite a good resistance to cold, −17.9° C., but slightly above the winter specification. This mixture would make a correct biodiesel fuel that can be used alone without it being necessary to prepare any mixtures.

EXAMPLE 3

A biodiesel mixture C will be produced from the mixture A which will be subjected to cracking, at the end of which the C7 aldehyde will be extracted from the mixture, and then the ω-unsaturated C11 ester will be separated therefrom and, finally, the fraction rich in residual ricinoleic ester will be separated in order to recycle it to the cracking of the other C18/C16 esters. At the end of these operations, the ω-unsaturated C11 ester and the other C18/C16 esters will be mixed, not the ricinoleic ester.

It will result in the following mixture of esters, expressed as S by weight:
C11: 1: 57.1
C16: 0: 4.7
C18: 0: 5.5
C18: 1: 14.6
C18: 1 OH: 0
C18: 2: 18.2

This biodiesel will be exceptionally good with a octane number of 56, a viscosity close to 3.6 in the low range, and a very good resistance to cold, below −20° C. This type of mixture could be used virtually without the need of an outside contribution.

EXAMPLE 4

A biodiesel P will be produced from the mixture A which will be subjected to cracking, at the end of which the heptanaldehyde and the methyl ester of undecylenic acid will be extracted from the mixture, and then a partial extraction of the fraction rich in ricinoleate will be carried out for recycling to the cracking. The biodiesel mixture P will consist of the 10-undecylenic ester and the mixture of C16/C18 esters plus the part of the ricinoleate fraction not recycled.

It will result in the following mixture of esters, expressed as % by weight:
C11: 1: 50
C16: 0: 4
C18: 0: 5
C18: 1: 12
C18: 1 OH: 14
C18: 2: 15

The cetane number of this biodiesel will be good, greater than 50, and it will show a good resistance to cold, close to −20° C.

EXAMPLE 5

This example illustrates a "theoretical" biodiesel E made up of the liquid effluent exiting the cracking reactor after simple separation of the heptanaldehyde. Its theoretical composition (the exact degree of cracking is not known) should be the following.
C11: 1: 42.9
C16: 0: 3.6
C18: 0: 4.1
C18: 1: 10.9
C18: 1 OH: 24.9
C18: 2: 13.7

Its performance levels will be inferior to those of the biodiesels C and D.

All the processes carried out result in a "by-product", heptanaldehyde. The producer will, however, be able to exploit this heptanaldehyde, which is a product of interest to industry in the form of heptanal, acetal, acid, alcohol, nitrile, etc.

The compositions of diesel fuel of the invention are illustrated by the examples hereinafter.

EXAMPLE 6

Preparation of a Mixture of a Diesel Oil and of 10-undecenoic acid methyl ester

The 10-undecenoic acid ester is prepared by thermal cracking of a methyl ester of castor oil. The 10-undecenoic acid methyl ester is isolated by distillation. Such a compound is commercially available and is produced by the applicant.

The 10-undecenoic acid methyl ester obtained is then mixed with a diesel fuel base representative of the Euro 2000 formulations: density about 0.830 at 15° C., sulfur content about 290 ppm, octane number of 51, distillation range 170-360° C. The 10-undecenoic acid methyl ester/fuel base ratio is 10% by weight. The octane number of the mixture is then measured according to standard ISO 5165. Said number is slightly higher than 51, which makes it possible to deduce that the octane number of the acetal in the mixture is about 52.

EXAMPLE 7

Comparative Tests of the Mixture with the Diesel Fuel Base

Tests are carried out with the objective of evaluating the performance levels in terms of particle emission of the compositions of diesel fuel containing 10% by weight of 10-undecenoic acid methyl ester, in comparison, with those obtained with the reference diesel fuel.

The tests were carried out on a diesel vehicle fitted with a direct injection engine. These tests were carried out over the cycle described in European directive 70/220/EC, modified by directive 98/69/EC (cycle called MVEG-11s Euro 2000). This cycle consists of an urban phase (EUDC cycle with a length of 4.052 km) and an extra-urban phase (ECE cycle with a length of 6.955 km). The test results, expressed in milligrams of particles per kilometer, are the following:

Diesel fuel at 90%+10% of 10-undecenoic acid methyl ester: ECE cycle 47 mg/km, EUDC cycle 55 mg/km, MVEG cycle 47 mg/km.

The reduction in particle emissions with the fuel according to the invention is about 10%.

The invention claimed is:

1. A biodiesel fuel comprising a mixture of fatty acid esters, said mixture containing a naturally occurring non-fossil compound of formula $ROOC-(CH_2)_n-CH_2-R_1$ in which R is either $CH_3$ or $C_2H_5$, n is 7 or 9, and $R_1$ is either $C_2H_5$ or $CH=CH_2$, wherein the content by weight of said non-fossil compound in the mixture is between 20 and 70%.

2. The fuel as claimed in claim 1, wherein the content of said non-fossil compound is between 30 and 60%.

3. The fuel as claimed in claim 1, wherein said non-fossil compound corresponds to the formula $CH_3OOC(CH_2)_8-R_1$ in which $R_1$ is either $C_2H_5$ or $CH=CH_2$.

4. The fuel as claimed in claim 1, wherein said non-fossil compound corresponds to the formula $CH_3OOC-(CH_2)_{10}-R_1$ in which $R_1$ is either $C_2H_5$ or $CH=CH_2$.

5. A biodiesel fuel comprising a mixture of fatty acid esters, said mixture containing a naturally occurring non-fossil compound of formula $ROOC-(CH_2)_n-CH_2-R_1$ in which R is either $CH_3$ or $C_2H_5$, n is 7 or 9, and $R_1$ is either $C_2H_5$ or $CH=CH_2$, wherein the content by weight of said non-fossil compound in the mixture is between 20 and 70%, said biodiesel fuel made by a process comprising transesterification of triglycerides of oil from castor seeds and/or lesquerella seeds with a light alcohol to form a mixture comprising glycerol, nonhydroxylated fatty esters and hydroxyesters; and separating said glycerol from said mixture; and thereafter separating said nonhydroxylated fatty esters to form a fraction enriched in hydroxyesters; and cracking said fraction enriched in hydroxyesters to form a mixture comprising heptanaldehyde, acid esters of formula $ROOC-(CH_2)_n-CH_2-R_1$ in which R is either $CH_3$ or $C_2H_5$, n is 7 or 9, and $R_1$ is $CH=CH_2$ and C11 and/or C13 w-unsaturated esters, without having an effect on the C18 unsaturated esters; and separating said heptanaldehyde from said acid hydroxy esters and said C11 and/or C13 ω-unsaturated esters; and mixing said acid hydroxy esters and said C11 and/or C13 ω-unsaturated esters with said nonhydroxylated fatty esters to form a biodiesel fuel.

* * * * *